United States Patent
Zakowski

(10) Patent No.: US 9,398,831 B2
(45) Date of Patent: Jul. 26, 2016

(54) FOOD PUSHER FOR FOOD PROCESSOR

(71) Applicant: Joseph W. Zakowski, New Canann, CT (US)

(72) Inventor: Joseph W. Zakowski, New Canann, CT (US)

(73) Assignee: CONAIR CORPORATION, Stamford, CT (US)

( * ) Notice: Subject to any disclaimer, the term of this patent is extended or adjusted under 35 U.S.C. 154(b) by 297 days.

(21) Appl. No.: 14/246,332

(22) Filed: Apr. 7, 2014

(65) Prior Publication Data

US 2014/0299697 A1 Oct. 9, 2014

Related U.S. Application Data

(60) Provisional application No. 61/809,481, filed on Apr. 8, 2013.

(51) Int. Cl.
| | |
|---|---|
| A47J 43/00 | (2006.01) |
| A47J 43/07 | (2006.01) |
| A47J 43/04 | (2006.01) |
| A47J 43/046 | (2006.01) |
| A47J 37/10 | (2006.01) |
| A47J 44/00 | (2006.01) |

(52) U.S. Cl.
CPC ............ *A47J 43/0716* (2013.01); *A47J 37/106* (2013.01); *A47J 43/04* (2013.01); *A47J 43/046* (2013.01); *A47J 44/00* (2013.01); *A47J 2203/00* (2013.01)

(58) Field of Classification Search
CPC ......... A47J 43/00; A47J 43/04; A47J 43/046; A47J 43/0716
USPC ............... 241/282.1, 282.2, 92, 37.5; 99/511
See application file for complete search history.

(56) References Cited

U.S. PATENT DOCUMENTS

| | | | | |
|---|---|---|---|---|
| 6,813,997 | B1 * | 11/2004 | Lin ....................... | A47J 19/027 99/492 |
| 7,066,082 | B2 * | 6/2006 | O'Loughlin .......... | A47J 19/027 99/511 |
| 7,587,974 | B2 * | 9/2009 | Cohen ................. | A47J 43/0716 426/231 |
| 8,939,070 | B2 * | 1/2015 | Cheung ................... | A23N 1/02 99/511 |
| 2007/0210193 | A1 * | 9/2007 | Larsen .................. | A47J 19/027 241/92 |

* cited by examiner

*Primary Examiner* — Faye Francis

(74) *Attorney, Agent, or Firm* — Grogan, Tuccillo & Vanderleeden, LLP

(57) ABSTRACT

A food pusher for a food processor is provided. The food pusher includes a first member configured to be slidably received in a feed tube of a food processor, and a second member slidably received in the first member. The second member includes a valve positioned at the bottom thereof that is configured to open when the second member is fully inserted into the first member to release the liquid contents of the second member.

10 Claims, 6 Drawing Sheets

FIG. 7 is a side elevational view of the food pusher of FIG. 5.

FIG. 8 is a cross-sectional, perspective view of the food pusher of FIG. 5

FOOD PUSHER FOR FOOD PROCESSOR

CROSS-REFERENCE TO RELATED APPLICATIONS

This application claims the benefit of U.S. Provisional Application Ser. No. 61/809,481, filed on Apr. 8, 2013, which is herein incorporated by reference in its entirety.

FIELD OF THE INVENTION

The present invention relates to food processors and, more particularly, to a food pusher for a food processor having a mechanism for measuring and dispensing liquids.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and expanded functionality.

SUMMARY OF THE INVENTION

It is an object of the present invention to provide a food processor having a pusher.

It is another object of the present invention to provide a food processor having a pusher that includes a mechanism for measuring and dispensing liquids during processing.

These and other objects are achieved by the present invention.

According to an embodiment of the present invention, a food pusher for a food processor is provided. The food pusher includes a first member configured to be slidably received in a feed tube of a food processor, and a second member slidably received in the first member. The second member includes a valve positioned at the bottom thereof that is configured to open when the second member is fully inserted into the first member to release the liquid contents of the second member.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
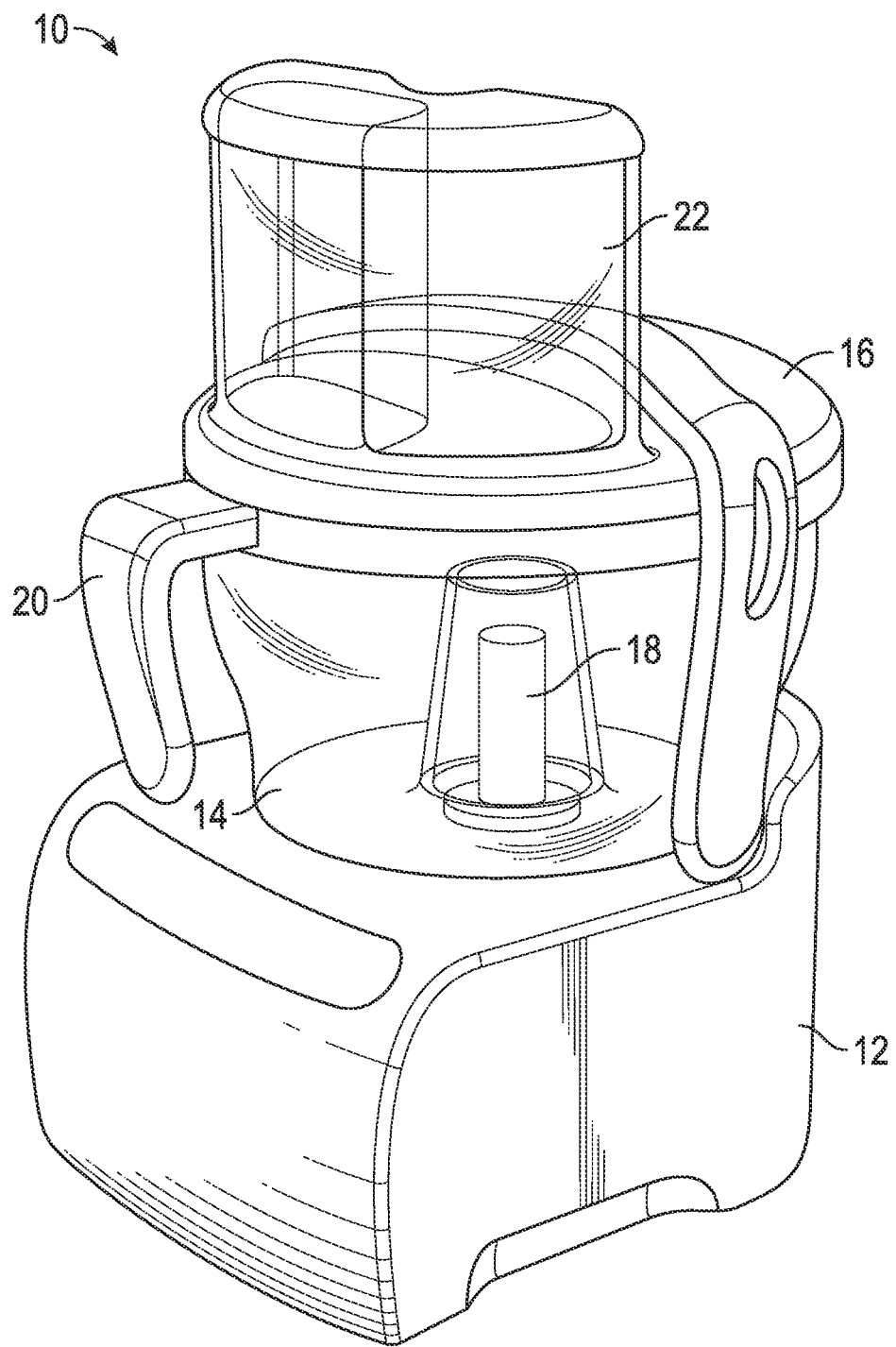
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
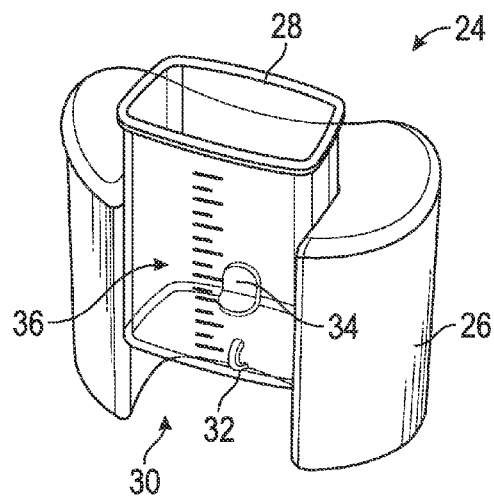
FIG. 2 is a perspective view of a food pusher for a food processor according to an embodiment of the present invention.

Turning now to FIG. 2, a food pusher 24 is slidably received in the feed tube 22. As is known in the art, the food pusher is utilized by a user to urge food items in the feed tube 22 into the work bowl 14 for processing by the blade assembly (not shown). As shown therein, the food pusher 24 includes a first member 26 and a second member 28 slidably received by the first member 26. In particular, the first member 26 defines a generally annular body having sidewalls and a closed top and bottom. The first member 26 is sized and shaped so as to be closely and slidably received by the internal walls of feed tube 22. The first member 26 also includes a channel 30 for slidably receiving the second member 28, and a small shoulder or protrusion 32 that extends outward into the channel 30.

Figure 3:
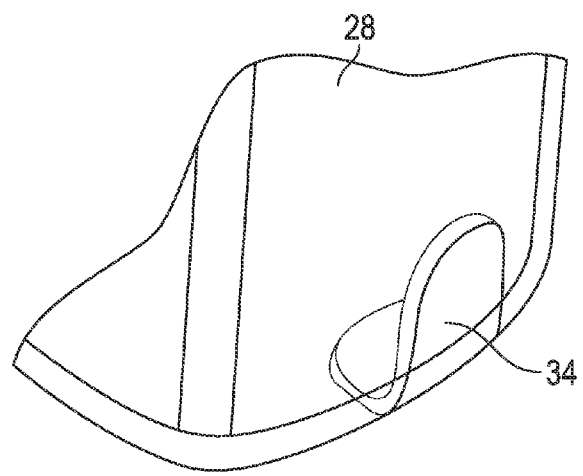
FIG. 3 is a enlarged, perspective view of a portion of the food pusher of FIG. 2.

As further shown in FIG. 2, the second member 28 is sized and shaped so as to be closely and slidably received in the channel 30 of the first member 26. Importantly, the second member 28 has a closed bottom an open top, as discussed in detail hereinafter. With reference to FIG. 3, a bottom, rear edge of the second member 28 includes an aperture configured with a resilient crush valve 34 that is normally closed. The crush valve 34 is preferably an overmold valve and may be formed from rubber, although other materials known in the art may also be utilized.

In the preferred embodiment, the first member 26 and second member 28 of the food pusher 24 are formed from plastic, although other materials known in the art may also be utilized without departing from the broader aspects of the present invention. Importantly, the second member 28 is formed from a transparent material and includes graduated markings or tick marks 36 to allow a user to visually determine how much liquid is in the second member 28.

An important aspect of the present invention is that it allows a user to measure and dispense liquids into the work bowl 14 of the food processor 10 during processing. In particular, in operation, the first pusher member 26 may be inserted into the feed tube 22 and processing commenced. When a user desires to add liquids to the bowl 14, a user can fill the second pusher member 28 with the desired amount of liquid, utilizing the graduated markings 36 on the front thereof. Once filled with liquid, the user inserts the second pusher member 28 into the channel 30 of the first pusher member 26 and pushes the second pusher member 28 downward.

Figure 4:
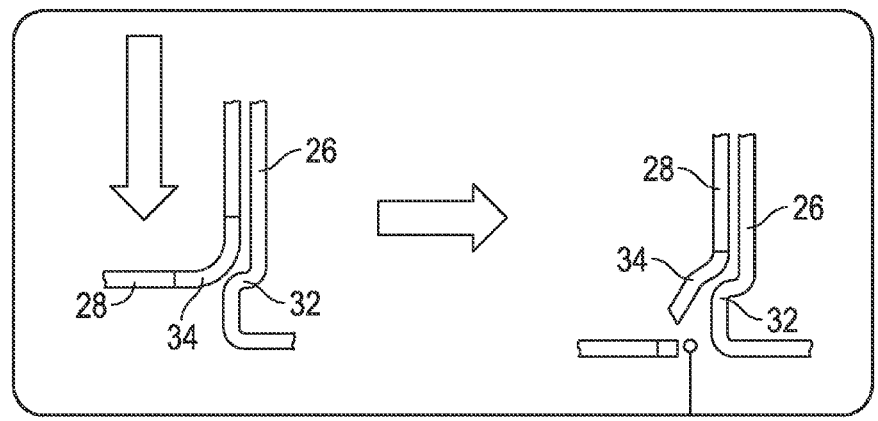
FIG. 4 is a an detail, side elevational view of a portion of the food pusher of FIG. 2, illustrating a liquid dispensing feature.
Figure 5:
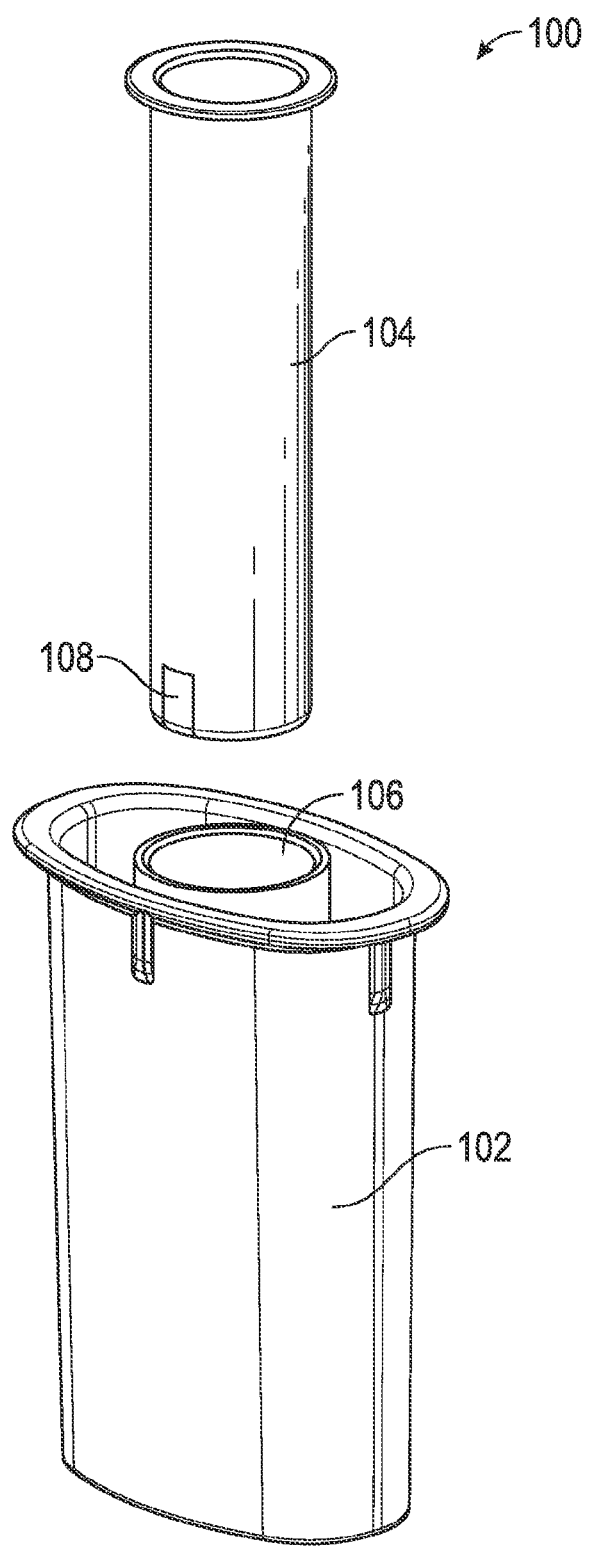
FIG. 5 is perspective view of a food pusher for a food processor according to another embodiment of the present invention.
Figure 6:
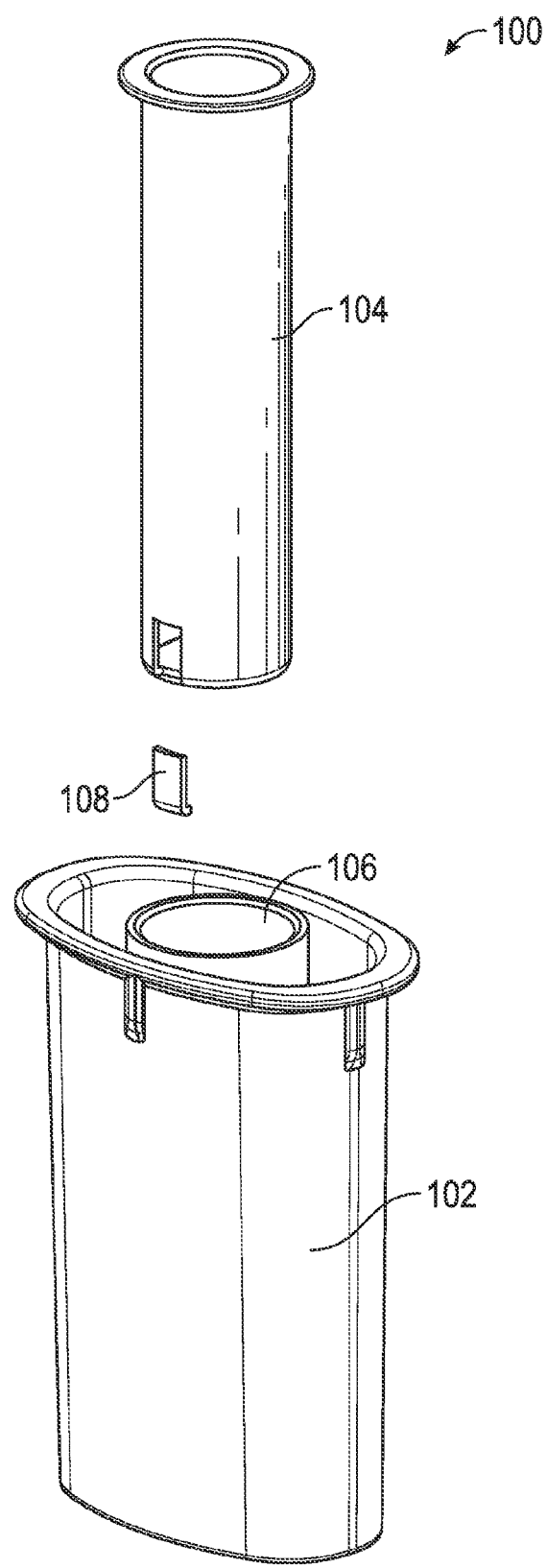
FIG. 6 is an exploded view of the food pusher of FIG. 5.
Figure 7:
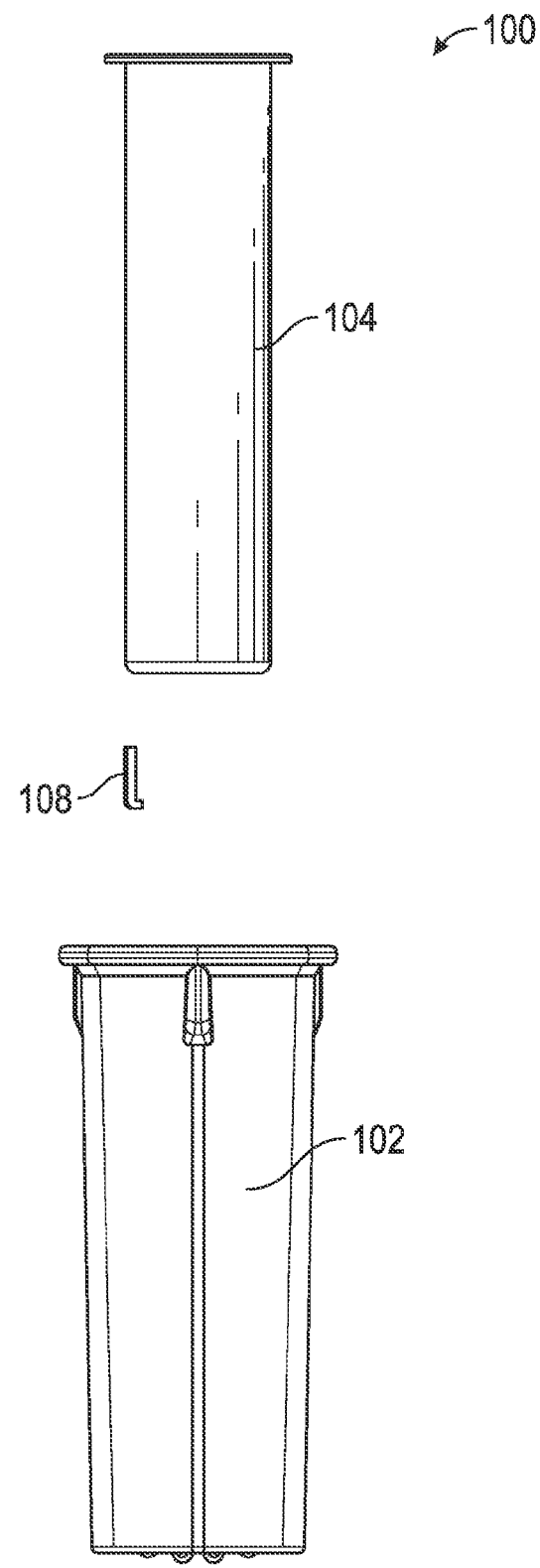
Figure 8:
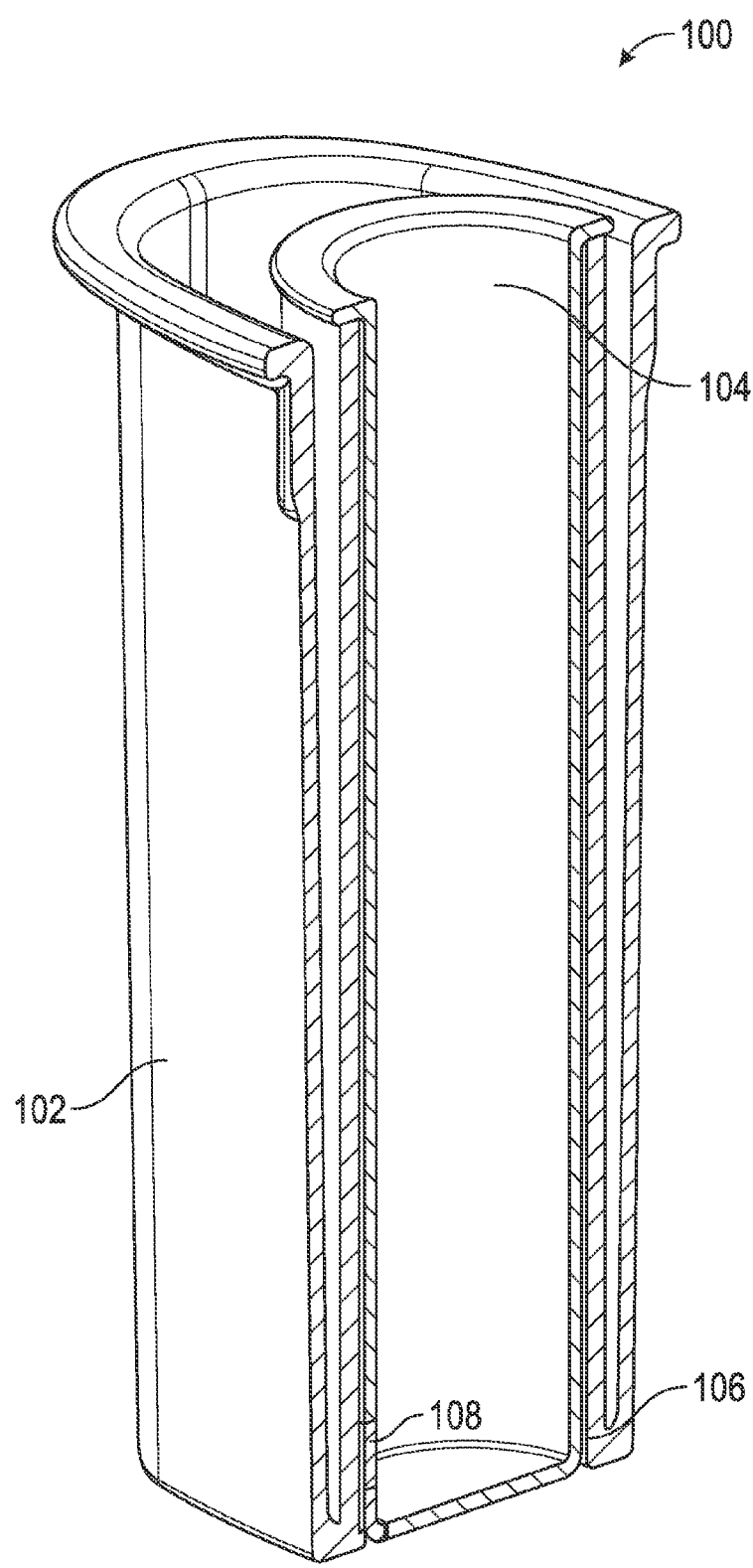

Referring to FIG. 4, when the crush valve 34 comes into contact with the protrusion 32 at the bottom of the channel 30 of the first pusher member 26, the crush valve 34 is urged to an open position, thereby releasing the liquid contents of the second pusher member 28 into the work bowl 14. As will be readily appreciated, this provides quick, easy and convenient way to measure and dispense liquids into the work bowl 14. When the second member 28 is removed from the channel 30, the crush valve 30 automatically returns to its closed position.

With reference to FIGS. 5-8, an alternative embodiment of a food pusher 100 is shown. As shown therein, the food pusher 100 includes a first member 102 and a second member 104. The first member 102 defines a generally annular body having sidewalls and a closed bottom, and a substantially cylindrical channel 106 extending through the center thereof from top to bottom. The first member 102 is sized and shaped so as to be closely and slidably received by a feed tube of a food processer, in a manner similar to that described above. As shown therein, the first member 102 has a substantially oval cross-section.

The second member 104 is substantially cylindrical in shape and has a closed bottom end and an open top end. A bottom edge of the second member 104 includes an aperture configured with a resilient overmold valve or crush valve 108 that is biased to a closed position, as shown therein. The second member 104 is configured to be filled with a liquid and, in connection with this, may be transparent such that a user can visually determine how much liquid is contained therein.

Operation of the food pusher 100 is similar to that of food pusher 24 described above. In particular, in operation, the first pusher member 102 may be inserted into the feed tube of a food processor and processing commenced. When a user desires to add liquids, a user can fill the second pusher member 104 with the desired amount of liquid, and then insert the second pusher member 104 into the channel 106 of the first pusher member 102 and pushes the second pusher member 104 downward.

Upon pushing the second member 104 downward, the crush valve 108 comes into contact with a lip or protrusion (not shown) formed on the interior of the channel 106. This causes the crush valve 106 to be pushed inward such that it opens and releases the contents of the second member 104 into the work bowl.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
a base;
a motor disposed within said base;
an output shaft operatively connected to said motor and extending outwardly from said base, said output shaft being rotatable upon actuation of said motor;
a work bowl received on said base;
a lid removably received on said work bowl, said lid including a feed tube extending upwardly from said lid and defining a passageway configured to receive a food product therethrough for guiding said food product into said work bowl;
a first pusher member slidably received by said feed tube, said first pusher member having a shoulder; and
a second pusher member being in selective communication with said first pusher member and said shoulder such that said shoulder is configured to actuate a valve of said second pusher member.

2. The food processor of claim 1, wherein:
said first pusher member includes a body having a channel formed therein, a bottom surface for contacting said food product, and said shoulder extending into said channel adjacent to said bottom surface; and
wherein said second pusher member is slidably received in said channel of said first pusher member and is configured to hold a volume of liquid, said second pusher member having a body having an open top, a bottom surface, an aperture formed in a rear edge of said body, and said valve disposed in said aperture.

3. The food processor of claim 2, wherein:
said valve is a crush valve, said crush valve being configured to contact said shoulder of said first pusher member to allow for the egress of said liquid from said second pusher member.

4. The food processor of claim 3, wherein:
said crush valve is an overmold valve formed from rubber.

5. The food processor of claim 1, wherein:
said first pusher member is sized and shaped so as to be closely received by internal sidewalls of said feed tube.

6. The food processor of claim 2, wherein:
said channel is substantially circular in cross-section.

7. The food processor of claim 2, wherein:
said channel is substantially U-shaped.

8. The food processor of claim 2, wherein:
said second pusher member is formed from a transparent material and includes a plurality of graduated markings.

9. The food processor of claim 1, wherein:
said first pusher member includes a top surface opposed to said bottom surface and substantially enclosing said body.

10. The food processor of claim 1, wherein:
said second pusher member is substantially rectangular in shape.

* * * * *